United States Patent
Wilson et al.

(10) Patent No.: US 10,208,584 B2
(45) Date of Patent: Feb. 19, 2019

(54) FIBER OPTIC CURRENT MONITORING FOR ELECTROMAGNETIC RANGING

(71) Applicant: Halliburton Energy Services, Inc., Houston, TX (US)

(72) Inventors: Glenn A. Wilson, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 17 days.

(21) Appl. No.: 15/031,207

(22) PCT Filed: Dec. 18, 2013

(86) PCT No.: PCT/US2013/075908
§ 371 (c)(1),
(2) Date: Apr. 21, 2016

(87) PCT Pub. No.: WO2015/094202
PCT Pub. Date: Jun. 25, 2015

(65) Prior Publication Data
US 2016/0237807 A1  Aug. 18, 2016

(51) Int. Cl.
*E21B 47/022* (2012.01)
*E21B 43/24* (2006.01)
(Continued)

(52) U.S. Cl.
CPC .......... *E21B 47/02216* (2013.01); *E21B 7/04* (2013.01); *E21B 7/06* (2013.01);
(Continued)

(58) Field of Classification Search
None
See application file for complete search history.

(56) References Cited

U.S. PATENT DOCUMENTS 4,609,871 A   9/1986  Bobb
4,994,747 A * 2/1991  Stolarczyk ............... G01V 3/30
                                                  324/334
(Continued)

FOREIGN PATENT DOCUMENTS

RU         2295033 C2    3/2007
WO     WO 1998/015850 A1  4/1998
(Continued)

OTHER PUBLICATIONS

Ward, et al. "Electromagnetic Theory for Geophysical Applications." Electromagnetic Methods in Applied Geophysics, Jan. 1988, vol. 1, No, 3, pp. 131-311.
(Continued)

*Primary Examiner* — Shane Bomar
(74) *Attorney, Agent, or Firm* — Haynes and Boone, LLP

(57) ABSTRACT

A wellbore ranging system and method utilized between first and second wellbores includes an electromagnetic field sensing instrument disposed in the second wellbore, a conductive casing in the first wellbore, an electric current source exciting current flow in the conductive member, and a fiber optic sensor disposed adjacent the conductive member. The current flow along the conductive member results in a magnetic field which is measured by the sensing instrument. The fiber optic sensor includes a core that is responsive to the magnetic field in which it is disposed. The responsive core alters the optical property of an optical wave guide forming the sensor, which altered optical property can be utilized to measure the magnitude of the electrical current at the position of the sensor. The magnitude of the current and the measured magnetic field can be utilized to determine a range between the first and second wellbores.

28 Claims, 5 Drawing Sheets

(51) Int. Cl.
  *E21B 7/04*   (2006.01)
  *E21B 47/12*  (2012.01)
  *E21B 7/06*   (2006.01)
  *E21B 43/30*  (2006.01)
  *E21B 44/00*  (2006.01)
  *E21B 47/024* (2006.01)
  *G01V 3/02*   (2006.01)
  *G01V 3/08*   (2006.01)
  *G01V 8/10*   (2006.01)

(52) U.S. Cl.
  CPC ........ *E21B 43/2406* (2013.01); *E21B 43/305* (2013.01); *E21B 44/005* (2013.01); *E21B 47/024* (2013.01); *E21B 47/123* (2013.01); *G01V 3/02* (2013.01); *G01V 3/08* (2013.01); *G01V 8/10* (2013.01)

(56) References Cited

U.S. PATENT DOCUMENTS

| | | |
|---|---|---|
| 5,144,690 A    | 9/1992  | Domash |
| 5,218,301 A    | 6/1993  | Kuckes |
| 5,396,166 A    | 3/1995  | Vohra et al. |
| 5,463,313 A    | 10/1995 | Berkcan |
| 5,533,572 A *  | 7/1996  | Brady .................... E21B 43/122  166/250.05 |
| 6,102,137 A    | 8/2000  | Peter et al. |
| 6,188,811 B1   | 2/2001  | Blake |
| 6,480,000 B1   | 11/2002 | Kong et al. |
| 7,747,388 B2 * | 6/2010  | Mombourquette .. G01V 11/002  702/11 |
| 2008/0042636 A1 * | 2/2008  | Koste .................... G01R 15/205  324/96 |
| 2009/0102474 A1   | 4/2009  | Cranch et al. |
| 2009/0178850 A1   | 7/2009  | Waters et al. |
| 2009/0272578 A1 * | 11/2009 | MacDonald ........... C10G 21/22  175/26 |
| 2009/0308657 A1 * | 12/2009 | Clark ................. E21B 47/02216  175/45 |
| 2011/0191045 A1 * | 8/2011  | Boenisch ............. G01N 27/902  702/65 |
| 2011/0308859 A1   | 12/2011 | Bittar et al. |
| 2012/0014211 A1 * | 1/2012  | Maida, Jr. ............... E21B 47/09  367/13 |
| 2012/0092960 A1 * | 4/2012  | Gaston .................. E21B 47/101  367/35 |
| 2012/0283951 A1   | 11/2012 | Li et al. |
| 2013/0154632 A1   | 6/2013  | McEwen-King et al. |

FOREIGN PATENT DOCUMENTS

| | | |
|---|---|---|
| WO | WO 2012/067611 A1 | 5/2012 |
| WO | WO 2013/019224 A1 | 2/2013 |
| WO | WO 2013/025222 A1 | 2/2013 |

OTHER PUBLICATIONS

International Search Report and the Written Opinion of the International Search Authority, or the Declaration, dated Apr. 25, 2014, PCT/US2013/075908, 16 pages, ISA/US.

Decision to Grant issued for Russian Patent Application No. 2016117268, dated Jan. 15, 2018, 18 pages (with translation).

* cited by examiner

FIBER OPTIC CURRENT MONITORING FOR ELECTROMAGNETIC RANGING

The present application is a U.S. National Stage patent application of International Patent Application No. PCT/US2013/075908, filed on Dec. 18, 2013, the benefit of which is claimed and the disclosure of which is incorporated herein by reference in its entirety.

FIELD OF THE INVENTION

The invention relates to borehole drilling operations, and more particularly to methods and systems for tracking the drilling of multiple boreholes relative to one another. Most particularly, the invention relates to methods and systems for determining the relative location of a target well from a borehole being drilled utilizing a fiber optic sensor positioned in the target well.

BACKGROUND OF THE INVENTION

As easy-to-access and easy-to-produce hydrocarbon resources are depleted, there is an increased demand for more advanced recovery procedures. One such procedure is steam assisted gravity drainage (SAGD), a procedure that utilizes steam in conjunction with two spaced apart wellbores. Specifically, SAGD addresses the mobility problem of heavy oil in a formation through the injection of high pressure, high temperature steam into the formation. This high pressure, high temperature steam reduces the viscosity of the heavy oil in order to enhance extraction. The injection of steam into the formation occurs from a first wellbore (injector) that is drilled above and parallel to a second wellbore (producer). As the viscosity of the heavy oil in the formation around the first wellbore is reduced, the heavy oil drains into the lower second wellbore, from which the oil is extracted. Commonly, the two wellbores are drilled at a distance of only a few meters from one other. The placement of the injector wellbore needs to be achieved with very small margin in distance. If the injector wellbore is positioned too close to the producer wellbore, the producing well would be exposed to very high pressure and temperature. If the injector wellbore is positioned too far from the producer wellbore, the efficiency of the SAGD process is reduced.

It is well known that traditional surveying techniques, often referred to as "ranging", utilized to evaluate the distance between two wellbores suffer from a widening cone of uncertainty as the wellbores become longer, making it more difficult to achieve the precision in placement that is required in SAGD applications. Electromagnetic (EM) systems and methods have been employed in ranging to determine direction and distance between two wellbores.

In EM ranging systems, one of the wellbores is cased in a conductive metal (typically steel). This wellbore is typically referred to as the "target" wellbore and usually represents the SAGD injector wellbore. In any event, a current is applied to the target wellbore casing by a low-frequency current source. Currents flow along the wellbore casing and leak into the formation. The currents result in an EM field around the target wellbore. The EM fields from the currents on the target wellbore casing are measured using an electromagnetic field sensor system disposed in the other wellbore, which is typically the wellbore in the process of being drilled. This second wellbore usually represents the SAGD producer wellbore. Although it may be deployed on wireline, tubing or the like, in many cases, the electromagnetic field sensor system is carried by a drill string and represents a logging-while-drilling ("LWD") system.

The distance and direction from the LWD device to the target wellbore can be determined if the magnitude of the current on the target wellbore is known. However, while it is generally understood that the magnitude of current decreases along the length of the target wellbore and that current will leak into the formation, typically, the actual magnitude of the current, and particularly the distribution of the current along the target wellbore, is unknown. Thus, it is common practice to simply estimate the magnitude of the current in a target wellbore in order to yield ranging results. Otherwise, without knowing the current, the ratio of EM fields and/or their gradients can approximate the distance and direction from the LWD device to the target well. To improve upon LWD ranging, it would be advantageous to know the magnitude and distribution of current along the target wellbore.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. The drawing in which an element first appears is generally indicated by the left-most digit in the corresponding reference number.

DETAILED DESCRIPTION OF THE INVENTION

Figure 1:
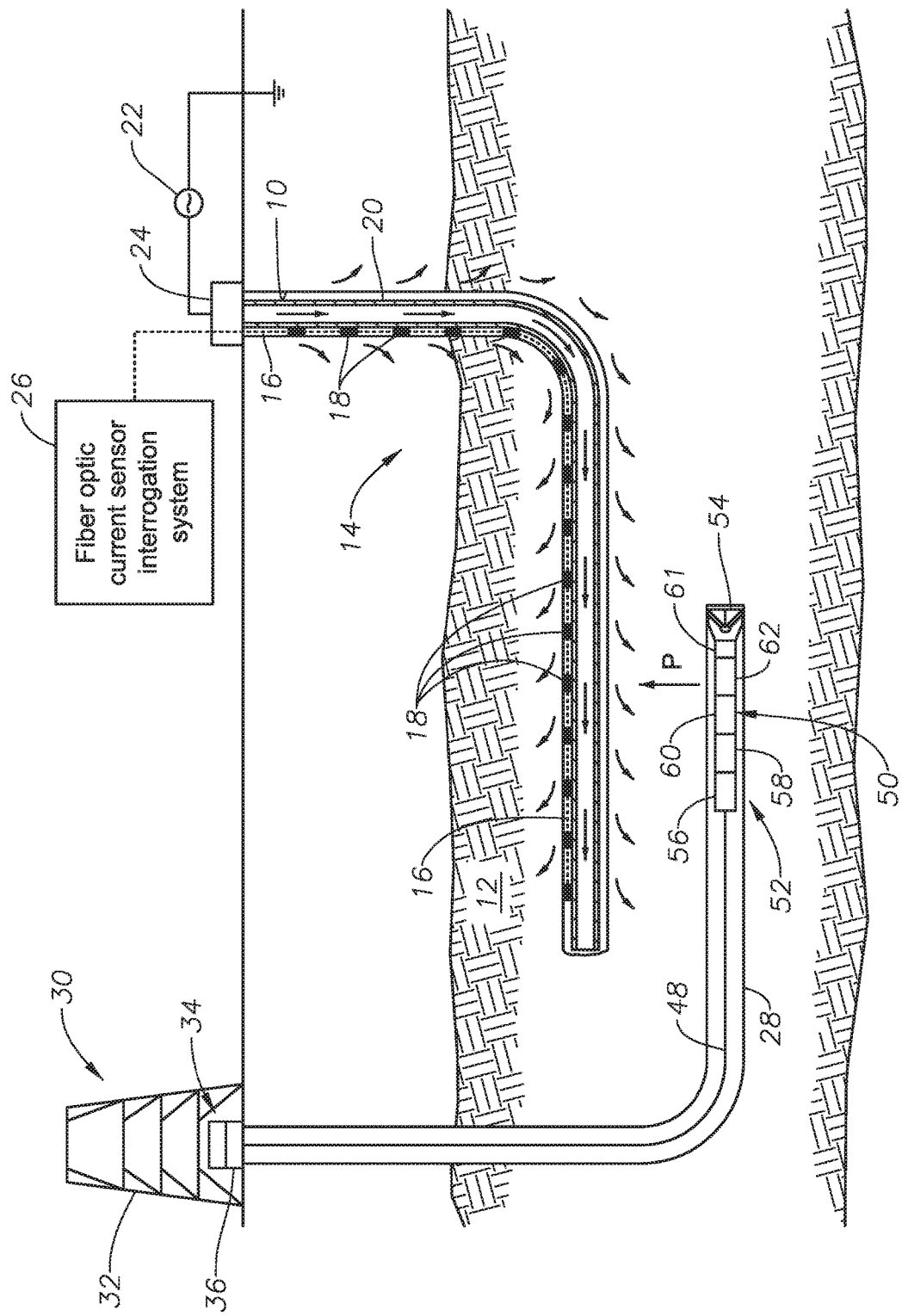
FIG. 1 illustrates EM ranging in a SAGD drilling system having fiber optic current sensors distributed along a target wellbore.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the FIGS. The spatially relative terms are intended to encompass different orientations of the apparatus in use or operation in addition to the orientation depicted in the FIGS. For example, if the apparatus in the FIGS. is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Figure 2:
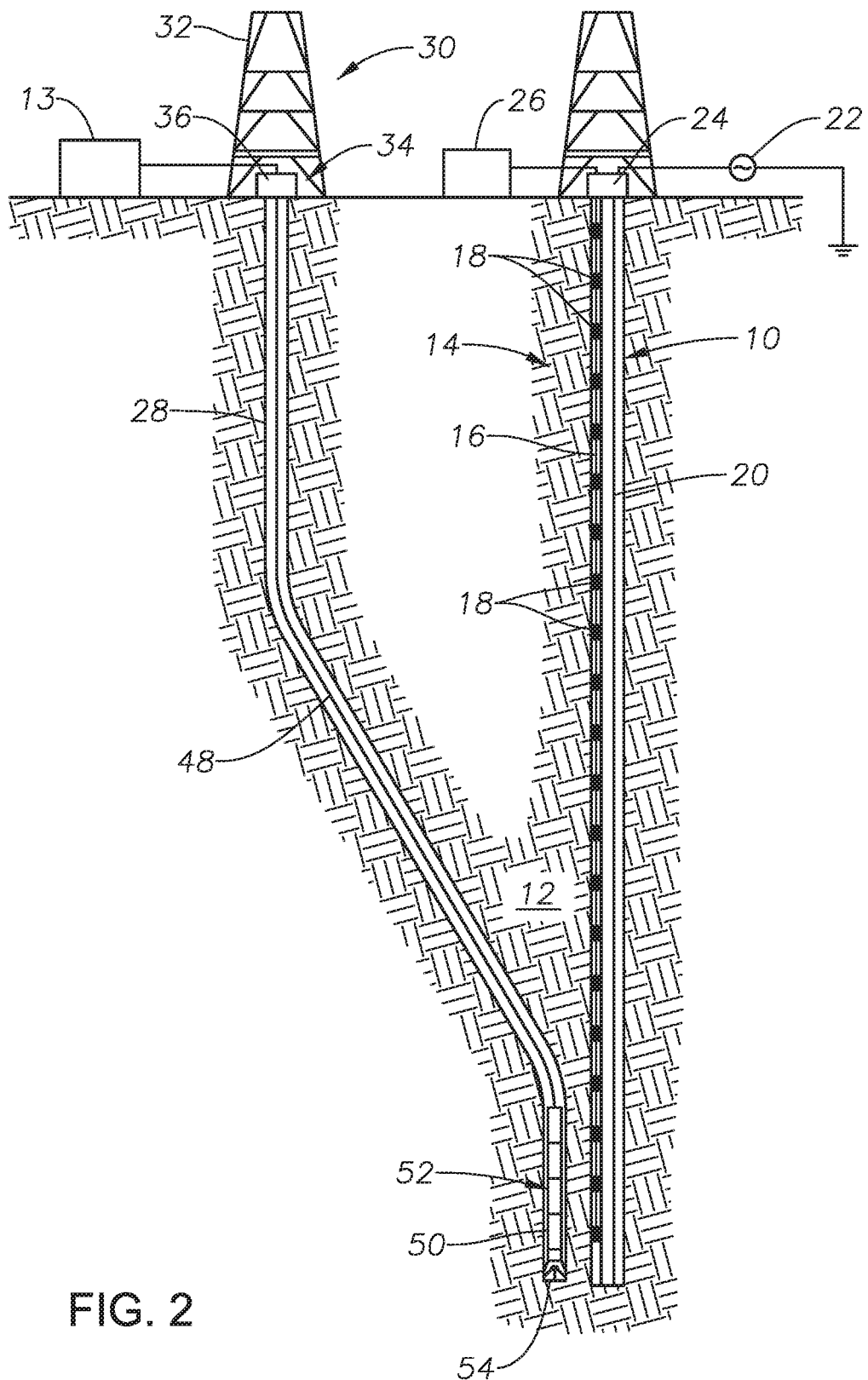
FIG. 2 illustrates EM ranging in a relief well operation having fiber optic current sensors distributed along a target wellbore.

Referring initially to FIGS. 1 and 2, a first wellbore 10 extends through the various earth strata including formation 12. First wellbore 10 includes a fiber optic current sensor system 14 installed therein, which sensor system 14 includes an optical fiber 16 having at least one fiber optic sensor 18 disposed along optical fiber 16. In some embodiments, a plurality of fiber optic sensors 18 may be disposed along an optical fiber 16 to form at least a one-dimensional array of fiber optic sensors 18. In this same vein, fiber optic current sensor system 14 may comprise a plurality of optical fibers 16 disposed within wellbore 10, each of the optical fibers having a plurality of fiber optic sensors 18 disposed along its length. The plurality of optical fibers may be spaced apart around wellbore 10 to form a two-dimensional array. In some embodiments, multiple fiber optic current sensors can be placed at different azimuths about wellbore 10 to obtain an azimuthal estimate of variations in the current along wellbore 10.

Disposed within wellbore 10 along at least a portion of its length is an elongated conductive member 20 which is generally oriented within wellbore 10 to be axially aligned therewith. Wellbore 10 may be cased or uncased. To the extent wellbore 10 is cased, in some embodiments, conductive member 20 may be the casing disposed within wellbore 10. For either cased or uncased wellbores, in some embodiments, conductive member 20 may be a wire deployed along wellbore 10 or tubing, a pipe string or tool string disposed within wellbore 10. In any event, conductive member 20 is disposed to conduct a current along at least a portion of the length of wellbore 10 to be surveyed utilizing fiber optic current sensor system 14. Moreover, conductive member 20 is generally disposed within wellbore 10 to radiate a magnetic field radially outward from wellbore 10.

An electric current source 22 is utilized to define a current waveform and excite current flow in conductive member 20. The current may be an alternating current having a low frequency, such as approximately 1 to 30 hertz. The particular manner in which current source 22 excites a current in conductive member 20 is not intended to be a limitation. In some embodiments, electric current source 22 may be a current generator directly connected to conductive member 20, such as at a casing head 24, and located on the surface of formation 12. In some embodiments, electric current source 22 may be disposed on the surface of formation 12 a distance removed from casing head 24, whereby a current is injected into the ground by a conductor and travels through formation 12 to conductive member 20. In some embodiments, electric current source 22 may be carried on a wireline, cable, tubing string or drill string disposed in another wellbore, as discussed in more detail below. As used herein, "current source" refers to any source use to generate an electric current and any electrical conductors, connections or equipment utilized to inject or otherwise deliver the current to conductive member 16. Thus, a current source may include an electric generator positioned at the surface of a wellbore and conductors positioned within a wellbore to inject current into the formation. Likewise, an electric generator may be a mud motor or similar power generation or power storage device positioned within a wellbore.

A fiber optic interrogation system 26 is disposed in optical communication with optical fiber 16. The disclosure is not limited to any particular type of fiber optic interrogation system, but may be selected based on the optical response for the particular survey system with which it is utilized. For example, the optical fiber 16 may be positioned in wellbore 10 for purposes in addition to the ranging system described herein and the fiber optic interrogation system 26 may be selected accordingly. In this regard, in some embodiments, other types of fiber optic sensors may be disposed along an optical fiber, including but not limited to acoustic, temperature, pressure, chemical and electromagnetic sensors. For example, the optical fiber cable can be interrogated in different manners for distributed temperature and/or distributed acoustic sensing.

In any event, at least a portion of the fiber optic current sensor system 14, namely sensor(s) 18, is positioned about the conductive member 20. In embodiments that utilize a casing as the conductive member 20, sensor(s) 18 are placed outside the casing. For example, sensor(s) 18 may be placed outside the casing and cemented into place. Sensor(s) 18 may be attached to the exterior of the casing. Likewise, if the conductive member 20 is tubing, a pipe string or tool string, sensor(s) 18 would be positioned on the exterior of the foregoing, such as by attachment, or otherwise radially spaced apart in the wellbore 10 from such conductive member 20. However, in such case, in one or more embodiments, this spacing or standoff distance be as small as possible. In some embodiments, therefore, a ranging tool may generally include a conductive member 20 (other than the wellbore casing) carrying a fiber optic sensor system 14. The ranging tool could be lowered into cased or uncased wellbores for ranging purposes. The ranging tool therefore, would conduct a current, propagate a magnetic field into the formation, and utilize an optic sensor system to measure the current along the tool.

With ongoing reference to FIGS. 1 and 2, there is shown a second wellbore 28. A drilling system 30 is generally shown associated therewith. Drilling system 30 may include a drilling platform 32 positioned over formation 12, and a wellhead installation 34, including blowout preventers 36. Platform 32 may be disposed for raising and lowering a conveyance mechanism 48.

Attached to the end of conveyance mechanism 48 is an electromagnetic (EM) sensor 50. The disclosure is not limited to any particular type of electromagnetic sensor 50. In some embodiments, the electromagnetic sensor 50 can measure at least one component of the magnetic field or the gradient of the magnetic field. In some embodiments, the electromagnetic sensor 50 can measure at least one component of the electric field or the gradient of the electric field.

With respect to FIG. 1, to the extent drilling system 30 is being utilized to actively drill second wellbore 28, conveyance mechanism 48 may be a tubing string or drill string, having a bottomhole assembly 52 attached to the end of string 48. Bottomhole assembly 52 includes electromagnetic sensor 50 and a drill bit 54. Bottomhole assembly may also include a power system 56, such as a mud motor, a directional steering system 58, a control system 60, a current injector system 61, and other sensors and instrumentation 62. As will be appreciated by persons of skill in the art, the bottom hole assembly 52 illustrated in FIG. 1 may be a measurement-while-drilling or logging-while-drilling system in which electromagnetic ranging can be utilized while a drill string is deployed in wellbore 28.

With respect to FIG. 2, conveyance system 48 may be a wireline, slickline, cable or the like and used to lower electromagnetic sensor 50 into wellbore 28. Power and communications to electromagnetic sensor 50 may be carried locally by appropriate modules 64 or may be transmitted via conveyance system 48.

The fiber optic current sensor system 14 as described herein may be deployed on land or may deployed offshore.

Moreover, fiber optic current sensor system 14 is not limited to any particular orientation of the first and second wellbores. As depicted in FIG. 1, first and second wellbores 10, 28, respectively are substantially horizontal wellbores. In such case, fiber optic current sensor system 14 may be particularly useful in ranging for SAGD operations. Alternatively, as depicted in FIG. 2, first and second wellbores 10, 28, respectively are substantially vertical wellbores. Thus, fiber optic current sensor system 14 may be used in drilling relief wells or intersecting wells, such as when it is desirable to establish direct fluid communication between two wells. This may be particularly useful in well intervention operations, for example.

Figure 3:
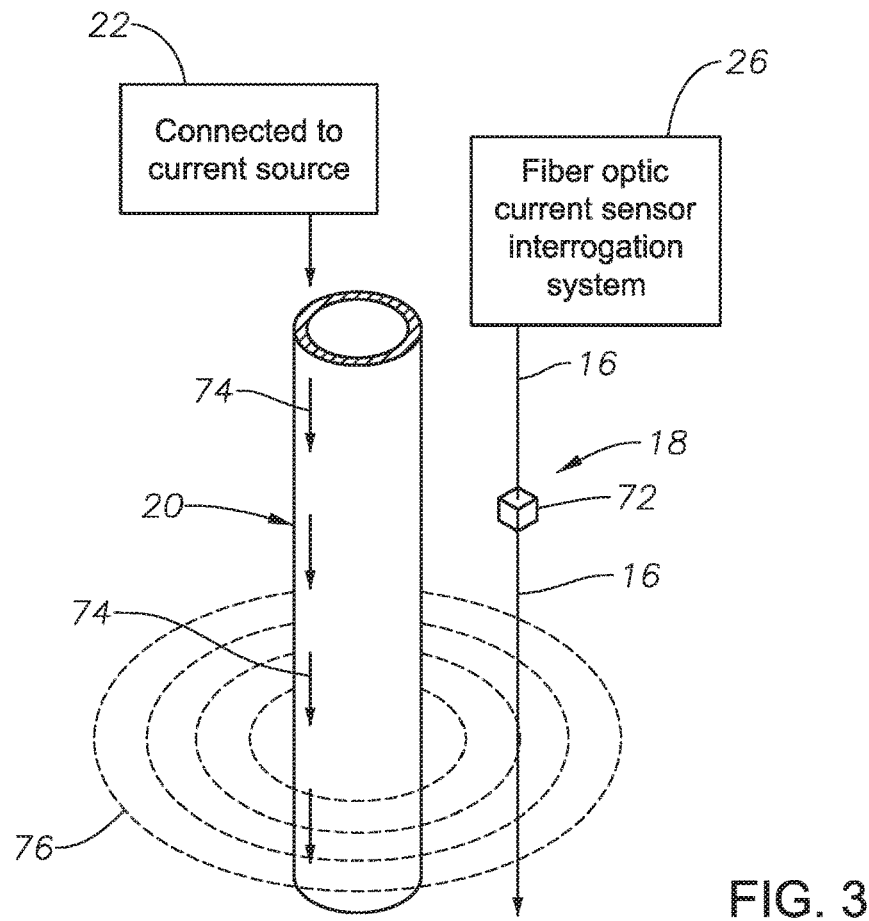
FIG. 3 illustrates a fiber optic current sensor disposed adjacent a casing section.

FIG. 3 shows a fiber optic sensor 18 disposed adjacent a conductive member 20, such as the illustrated casing section. In certain embodiments, fiber optic sensor 18 is generally formed of a magnetically or electrically responsive core or body 72. As shown, fiber optic sensor 18 is positioned along an optical fiber 16 that generally runs parallel with conductive member 20. Electrical current transmitted by conductive member 20 generally flows axially along conductive member 20 as illustrated by current lines 74 (although there may be some current leakage into the formation), resulting in a radially emanating magnetic field induced about conductive member 20, such as illustrated by magnetic field lines 76.

In embodiments where responsive core 72 is formed of a magnetically responsive body, fiber optic sensor 18 is disposed adjacent conductive member 20 so that magnetically responsive body 72 is within the magnetic field 76. As such, magnetic field 72 causes a reaction in magnetically responsive body 72. The reaction results in an optical change to optical fiber 16. The optical change in optical fiber 16 is dependent upon the strength of the magnetic field, which in turn is proportional to the current in conductive member 20 adjacent the fiber optic sensor 18.

In embodiments where responsive core 72 is formed of an electrically responsive body, the core may be an electrostrictive body.

The invention is exemplified in the following theoretical example which is not intended to limit the scope of the disclosure.

The target wellbore is defined by the coordinate system $r=\{x,y,z\}$ and can be approximated by an infinitely long current source oriented in the z direction in a homogeneous geological formation of conductivity $\sigma$, such that the electric current along the target wellbore casing can be approximated as:

$$J(r) = I\delta(r)\delta(z)\hat{u}_z, \quad (1)$$

The current I has a frequency dependence and is injected at the wellbore—in one ore more embodiments, at the wellhead—and conducted along the wellbore's elongated conductive member, i.e., the metal casing. Given the finite resistivity of the formation about the conductive member, current is leaked into the formation. Given the radial symmetry about the target wellbore, the electromagnetic fields can be described in cylindrical coordinates $r=(z,\rho,\theta)$ about the z axis. Note that the cylindrical coordinates $r=(z,\rho,\theta)$ can be transformed to Cartesian coordinates $r=(x,y,z)$, and vice versa.

Of particular interest to electromagnetic ranging is the distance to the target wellbore from the electromagnetic field sensing unit in the second wellbore, $\rho=\sqrt{x^2+y^2}$, and the direction (angle) to the target wellbore from the electromagnetic field sensing unit in the second wellbore, $\theta$. The orientation of the target wellbore relative to the electromagnetic field sensing unit in the second wellbore can be also be retrieved.

The frequency-domain magnetic field excited about the target wellbore only has a $\theta$-directed tangential component:

$$H_\theta(r, \omega) = \frac{ikI}{2\pi} K_1(ik\rho)\hat{u}_\theta, \quad (2)$$

where $k=\sqrt{i\omega\mu\sigma}$ is the wavenumber, $\rho$ is the radial distance between the two wellbores in the xy-plane, and $K_1$ is the modified Bessel function of the second kind of order one. At low frequencies used for and small distances typically encountered in EM ranging, the modified Bessel function in equations (2) can be approximated by:

$$K_1(ik\rho) \approx \frac{-1}{ik\rho}, \quad (3)$$

such that the magnetic fields (2) can be expressed as:

$$H_\theta(r, \omega) = -\frac{I}{2\pi\rho}\hat{u}_\theta, \quad (4)$$

The current I, which has heretofore been unknown in prior art methods, is measured along the conductive member in the target wellbore using fiber optic current sensors. Hence, the distance from the electromagnetic field sensing unit in the second wellbore to the conductive member in the target wellbore can be approximated by:

$$\rho = -\frac{I}{2\pi H_\theta(r, \omega)}. \quad (5)$$

The direction from the electromagnetic field sensing unit in the second wellbore to the conductive member in the target wellbore is simply given by the direction orthogonal to both $H_\theta(r,\omega)$ and the z axis of the second wellbore. Hence, the relative distance, direction and angle between two wellbores can be determined and drilling trajectory, whether for purposes of intercepting the wellbores or drilling the wellbores in a parallel or other relationship, can be accordingly adjusted.

Figure 4:
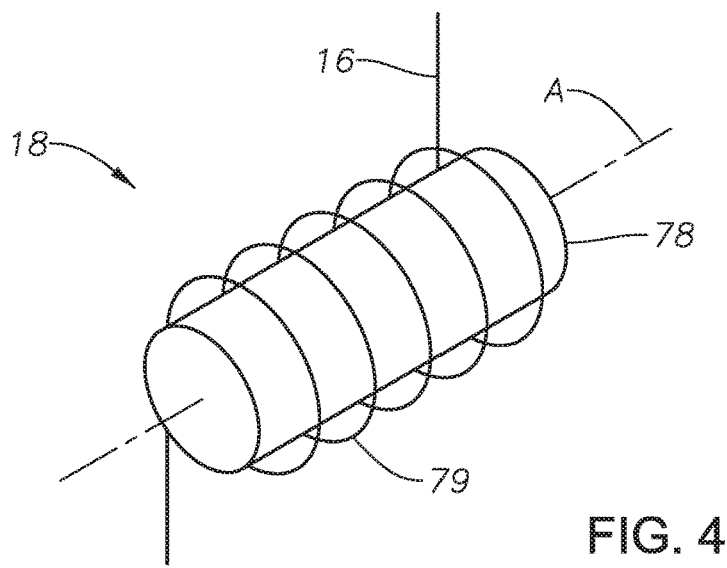
FIG. 4 illustrates an embodiment of a fiber optic current sensor formed of a magnetically permeable body.

Turning to FIG. 4, one embodiment of a fiber optic sensor 18 is illustrated. In this embodiment, responsive core or body 72 is magnetically responsive and shown as a magnetically permeable core 78 with a portion of optical fiber 16 forming at least one, and in one or more embodiments, a plurality of loops around core 78 in the form of an optical fiber coil 79. Although not a limitation, core 78 may have a round cross-section shape. In other embodiments, the cross-sectional shape may be square or some other polygonal shape. Core 78 may be solid or hollow. In one or more embodiments, core 78 is elongated and disposed along a primary axis A. In these embodiments, the fiber optic current sensor 18 exploits the Faraday rotation effect in a fiber coil, whereby the polarization of light in an optical fiber is rotated with the propagation of light along a magnetic field line. In some embodiments, the magnetically permeable core is a thin ferrite shaft or tube. This essentially emulates a ferritecored solenoid. This fiber coil measures the magnetic fields induced about casing, from which the current can be estimated, or other transfer functions derived with respect to the BHA system.

It should be noted that in some embodiments of the disclosure where an optical fiber coil 79 is formed, the electrically conductive body 20 can function as the magnetically responsive body.

Figure 5:
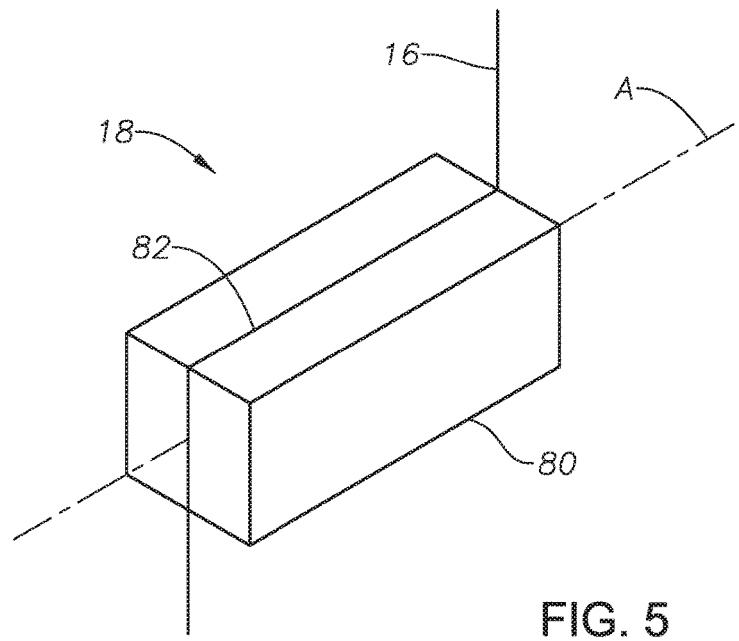
FIG. 5 illustrates an embodiment of a fiber optic current sensor formed of a magnetostrictive body.

Turning to FIG. 5, another embodiment of a fiber optic sensor 18 is illustrated. In this embodiment, responsive core or body 72 is magnetically responsive and shown as a magnetostrictive body 80. The magnetostrictive body 80 may be formed of cobalt, $Tb_xDy_{1-x}Fe_2$, such as Terfenol-D, or $Fe_{81}Si_{3.5}B_{13.5}C_2$, such as Metglas, in some embodiments. The body 80 is not limited in shape. However, in one or more embodiments, the body 80 may be elongated and disposed along an axis A. For example, the body 80 may have a round cross-sectional shape. In other embodiments, the cross-sectional shape of the body 18 may be square or some other polygonal shape. Body 80 may be solid or hollow. Optical fiber 16 is rigidly attached to or otherwise bonded to at least a portion of body 80, such as at bond line 82. Thus, changes in the shape of body 80 will result in strain, and hence an optical change, in optical fiber 16. The strain can be measured using a fiber laser strain sensor interrogation system from which the current can be estimated, or other transfer functions derived with respect to the BHA system.

Figure 6:
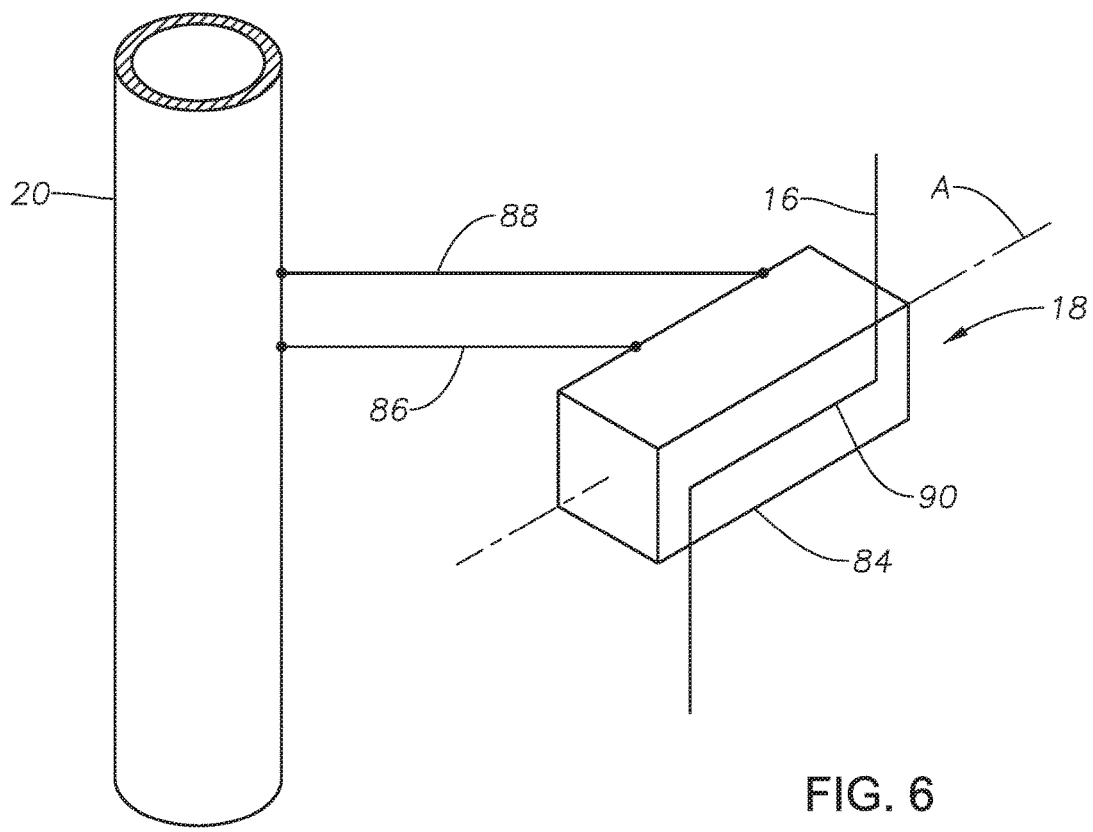
FIG. 6 illustrates an embodiment of a fiber optic current sensor formed of an electrostrictive body.

Turning to FIG. 6, another embodiment of a fiber optic sensor 18 is illustrated. In this embodiment, responsive core or body 72 is electrostrictive, formed of a dielectric material and shown as electrostrictive body 84. Without limiting the foregoing, such electrostrictive material may include engineered ceramics, or relaxor ferroelectrics, such as lead magnesium niobate (PMN), lead magnesium niobate-lead titanate (PMN-PT) or lead lanthanum zirconate titanate (PLZT), lead zirconate titanate (PZT) or lithium niobate. The current in conductive member 20 may be derived from measurement of the electric field, which itself is measured from the potential difference between two electrodes. In some embodiments, the electrodes 86, 88 are in contact with the conductive member 20, such as the metal casing, to measure an axial potential difference. In other embodiments, one electrode is in contact with the conductive member 20 and the other electrode is in contact with the formation to measure a radial potential difference. Regardless of the electrode configuration, the potential difference across the electrodes drives electrostrictive body 84. The body 84 is not limited in shape. However, in one or more embodiments, the body 84 may be elongated and disposed along an axis. For example, the body 84 may have a round cross-sectional shape. In other embodiments, the cross-sectional shape of the body 18 may be square or some other polygonal shape. Body 84 may be solid or hollow. Optical fiber 16 is rigidly attached to or otherwise bonded to at least a portion of body 84, such as at bond line 90. Thus, changes in the shape of body 84 will result in strain, and hence an optical change, in optical fiber 16. The strain can be measured using a fiber laser strain sensor interrogation system from which the current can be estimated, or other transfer functions derived with respect to the BHA system.

Figure 7:
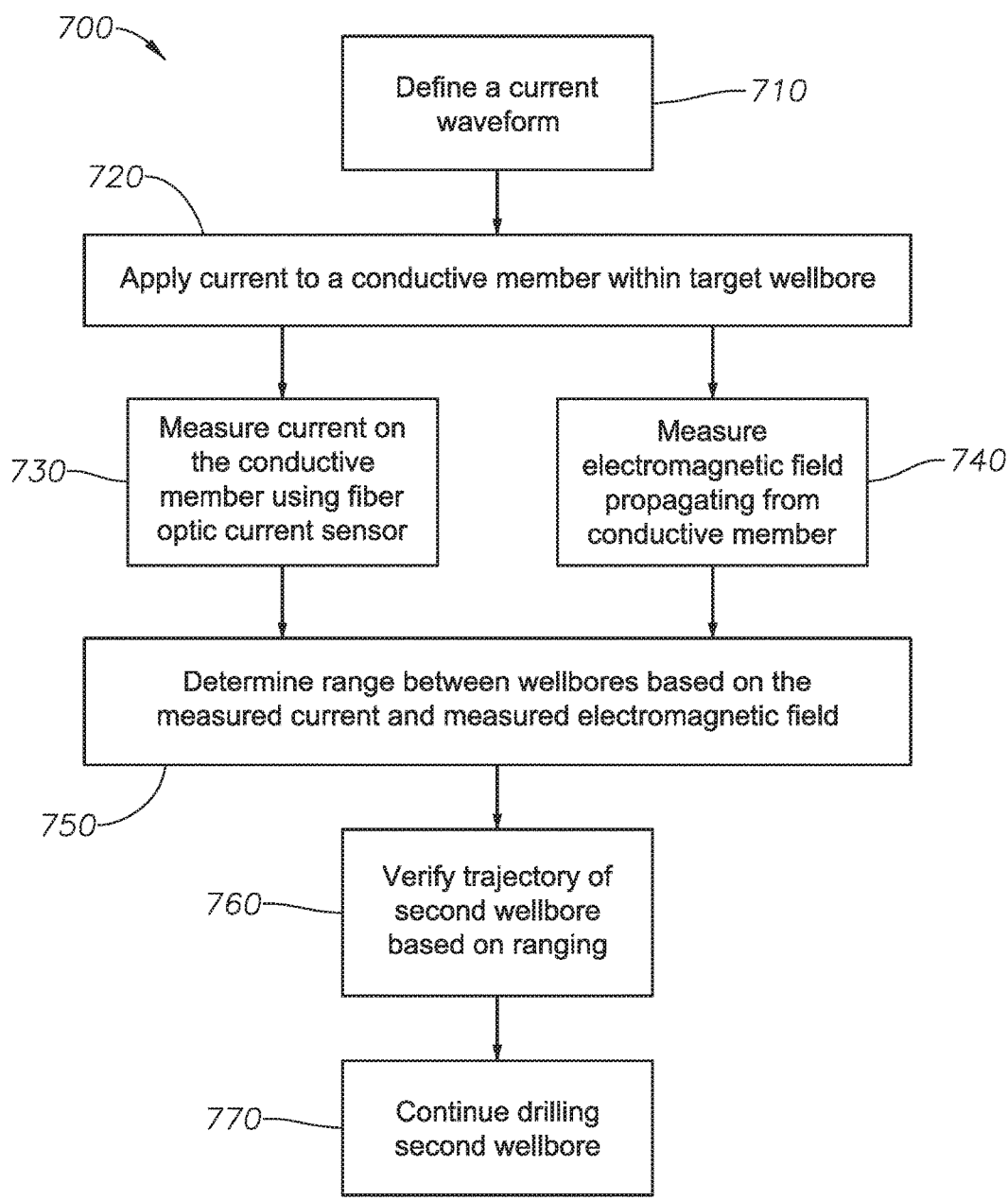
FIG. 7 shows a flow chart of one method for electromagnetic ranging utilizing fiber optic current sensors.

FIG. 7 is a flowchart illustrating embodiments of the ranging method utilizing optical sensors. The ranging method 700 includes methods for utilizing an optical sensor, methods for measuring current along a conductive body. In some embodiments, the ranging method may be utilized in SAGD operations or for intersecting wellbores, such as in well intervention operations. In any event, in a first step 710, a current is generated by an electrical source, and the wave form of the current is defined. In this regard, the magnitude and frequency of the current may be selected. The current is typically an alternating current. In step 720, the current is applied or injected to a conductive member disposed in a first wellbore, such as, for example, the metal casing of a target wellbore. The current may be applied by directly connecting an electrical source to the conductive member. For example, if the conductive member is the metal casing within the first wellbore, electrical leads may be attached to the wellhead or casing hanger at the top of the casing string. Alternatively, the current may be applied by injecting the current into a formation adjacent the first wellbore so that the current travels through the formation to the conductive member. In this regard, the current may be injected at the surface of a wellbore or may be injected from a second wellbore in the formation. The current may be injected as part of logging-while-drilling or measurement-while-drilling operations in the second wellbore.

In step 730, a fiber optic current sensor is utilized to measure the current on the conductive member. The fiber optic current sensor may be a single sensor or incorporated in an array of fiber optic current sensors as describe above. The fiber optic current sensor includes a core that is responsive to magnetic or electric changes resulting from the current in the conductive member. In some embodiments, a magnetic field generated by the current within the conductive member will result in a change in the physical shape of the core, such as a magnetostrictive core, which change causes a strain on an optical fiber. The strain on the optical fiber results in a change of the fiber's optical response and may be utilized to calculate the magnitude of the current in the conductive member at that point. In other embodiments, the electrical current at a particular location along the length of the conductive member may be applied to a sensor core. The electric current will result in a change in the physical shape of the core, such as an electrostrictive core, which change causes a strain on an optical fiber. The strain on the optical fiber results in a change of the fiber's optical response and may be utilized to calculate the magnitude of the current in the conductive member at that point. In other embodiments, the optical fiber may be looped or coiled around a magnetically permeable core. The magnetically permeable core enhances the magnetic field induced by the current in the conductive member, which enhanced magnetic field will alter the optical response of the fiber coil. The altered optical response can be utilized to calculate the magnitude of the current in the conductive member at that point. In other embodiments, a plurality of sensors disposed along the length of the conductive member may be used to determine current loss along the conductive member, such as loss of magnitude or leakage into the formation.

In step 740, an electromagnetic field sensing instrument is utilized to measure the electromagnetic field propagating from the conductive member. In some embodiments, the electromagnetic field sensing instrument is deployed in the second wellbore. To the extent deployed in the second wellbore, the electromagnetic field sensing instrument may be carried on a wireline, slickline, cable, tubing, pipe string, tool string or drill string, as a particular operation dictates. To the extend carried on a drill string, the electromagnetic field sensing instrument may be included as part of a bottom hole assembly (BHA) utilized during drilling operations. In some embodiments, drilling operations may be suspended while the electromagnetic fields are measured. While not necessary, in some embodiments, steps 730 and 740 may be practiced simultaneously, while in other embodiments the order of the steps may be reversed.

In step 750, the measured electromagnetic field and the measured current are utilized to determine or calculate a range between the first and second wellbores as described above. The calculated range may include distance, direction and angle of the second wellbore, and in particular, the electromagnetic field sensing instrument, to the first wellbore.

In step 760, once the range has been calculated, to the extend the ranging is utilized in directional drilling operations, the actual trajectory of the second wellbore may be verified against a desired trajectory. To the extent there is a discrepancy between the actual trajectory and the desired trajectory, the actual trajectory of the second wellbore may be altered or adjusted based on the calculated range in order to ensure the second wellbore is drilled as desired relative to the first wellbore. If a desired trajectory is based on a predetermined drilling plan and the actual trajectory has deviated from the desired trajectory, then the trajectory may be altered to achieve the desired trajectory. In this regard, to alter or adjust the trajectory of the wellbore, the drill bit may be repositioned or reoriented. Thus, results of the ranging may be utilized to guide a drill bit during directional drilling, such as in SAGD operations or wellbore intersect or intervention operations. In step 770, once the measurements have been obtained, and corrections to the trajectory of the second wellbore or orientation of the drill bit have been implemented, drilling of the second wellbore is continued along the correct trajectory.

To the extent the foregoing method is utilized in SAGD operations, once the second wellbore has been drilled, steam is injected into one of the wellbores to cause hydrocarbons in the formation to migrate to the other wellbore, after which, the hydrocarbons are recovered from the other wellbore.

Moreover, the methods described herein may be embodied within a system comprising processing circuitry to implement any of the methods, or a in a computer-program product comprising instructions which, when executed by at least one processor, causes the processor to perform any of the methods described herein.

One benefit to the system and method disclosed herein is that the fiber optic current measurement sensors are rotationally invariant to the orientation of the electromagnetic sensors, meaning that the sensors can be deployed from a rotated BHA device, or a wireline device, without needing orientation information about the BHA or wireline device. Furthermore, the methods can be practiced in real time. Thus, ranging can be determined on the fly and adjustments to drilling trajectories made without a delay in drilling.

Thus, a wellbore ranging system for surveying a target wellbore from a second wellbore has been described. Embodiments of the wellbore ranging system may generally have an electromagnetic field sensing instrument disposed in the second wellbore; an elongated conductive member in the target wellbore, the conductive member oriented along an axis that is substantially parallel with the target wellbore; an electric current source exciting current flow in the conductive member of the target wellbore; and a fiber optic sensor disposed adjacent the conductive member of the target wellbore. In other embodiments, a wellbore ranging system may generally have a bottom hole assembly carried at the distal end of a drill string disposed in the second wellbore, the bottom hole assembly comprising an electromagnetic field sensing instrument and a drill bit; an elongated conductive member in the target wellbore, the conductive member oriented along an axis that is substantially parallel with the target wellbore; an electric current source exciting current flow in the conductive member of the target wellbore; and a fiber optic sensor system, the fiber optic sensor system comprising a plurality of spaced apart fiber optic sensors, each sensor having a core formed of material selected from the group consisting of magnetically responsive material and electrically responsive material; a fiber optic interrogation system; an optical fiber extending from the fiber optic interrogation system to the cores, wherein a portion of the optical fiber is disposed adjacent to each core. Likewise, an optical sensor for measurement of an electric current has been described. Embodiments of the optical sensor may generally have a core formed of material selected from the group consisting of magnetically responsive material and electrically responsive material; and an optical fiber disposed adjacent said core. For any of the foregoing embodiments, the system or sensor may include any one of the following elements, alone or in combination with each other:

The fiber optic sensor comprises a core formed of material selected from the group consisting of magnetically responsive material and electrically responsive material; and an optical fiber disposed adjacent said core.

A sensor core is formed of a magnetostrictive material and the optical fiber is bonded to the core.

A sensor core is formed of a magnetically permeable material and the optical fiber forms at least one loop around the core.

A sensor the core is formed of an electrostrictive material and the optical fiber is bonded to the core.

A sensor core is comprised of an elongated body disposed along an axis and the sensor is positioned adjacent the conductive member so that the elongated axis of the core is substantially perpendicular to the axis of the conductive member.

A fiber optic interrogation system in optical communication with the fiber optic sensor.

An optical fiber extending from the fiber optic interrogation system to the fiber optic sensor.

A plurality of optic sensors disposed along at least a portion of the length of the conductive member to form a sensor array.

The conductive member is casing.

The conductive member is a tubular positioned within the target wellbore.

The electric current source is in direct electrical communication with the conductive member.

A drill string in the second wellbore, the drill string having multiple drill pipe sections with a drill bit disposed on an end of the drill string, wherein the electromagnetic sensor is carried by the drill string.

The conductive member is an electrically conductive casing disposed within the target wellbore and wherein the electric current source is in direct electrical communication with the conductive member, the bottom hole assembly further comprising a power system disposed to provide power to the electromagnetic field sensing instrument and a directional steering system disposed to steer the drill bit.

The fiber optic sensor comprises a magnetically responsive core and an optical fiber.

An optical fiber is bonded to a core.

An optical fiber is bonded to a magnetically responsive core.

An optical fiber forms at least one complete loop around a magnetically responsive core.

The fiber optic sensor comprises an electrically responsive core and an optical fiber.
A optical fiber is bonded to an electrically responsive core.
A sensor core is comprised of an elongated body disposed along an axis.
An elongated core body is a solid shaft.
An elongated core body is a hollow tube.
An elongated core elongated body has a round cross-sectional shape.
An elongated core body is square in cross-section.
An elongated core body is formed of ferrite.
An optical fiber forms a plurality of loops around a sensor core.
An optical fiber forms a coil disposed around a sensor core.
A sensor core is an elongated metal body disposed along an axis and the optical fiber forms a plurality of loops extending axially along at least a portion of the length of an elongated core body.
The axis of an elongated core body is substantially perpendicular to the axis of the conductive member.
A plurality of optic sensors.
A plurality of sensors forms an array.
A plurality of optic sensors are spaced apart along at least a portion of the length of the conductive member.
A plurality of sensors are radially spaced apart about the axis of the conductive member.
The conductive member is a wire disposed within the target wellbore.
A fiber optic interrogation system.
An optical fiber extending from a fiber optic interrogation system to the fiber optic sensor.
The electromagnetic field sensing instrument is a magnetometer.
The electromagnetic field sensing instrument is a gradiometer.
The electric current source is a time varying current source.
A time varying current source is a low frequency alternating current source.
The target wellbore comprises a wellhead and the electric current source is disposed adjacent the wellhead.
The electric current source is in direct electrical communication with the conductive member.
The electric current source is carried by the drill string in the second borehole.
A drill string in the second wellbore, the drill string having multiple drill pipe sections with a drill bit disposed on an end of the drill string, wherein the electromagnetic sensor is carried by the drill string.
A wireline extending into the second wellbore, wherein the electromagnetic sensor is carried by the wireline.
Tubing extending into the second wellbore, wherein the electromagnetic sensor is carried by the tubing.
A magnetically responsive material is a magnetostrictive material.
A magnetostrictive material is selected from the group consisting of cobalt, $Tb_xDy_{1-x}Fe_2$, and $Fe_{81}Si_{3.5}B_{13.5}C_2$.
A core is formed of electrostrictive material.
An electrostrictive material is selected from the group consisting of lead magnesium niobate (PMN), lead magnesium niobate-lead titanate (PMN-PT) or lead lanthanum zirconate titanate (PLZT), lead zirconate titanate (PZT) and lithium niobate.

A method for electromagnetic ranging has been described. Embodiments of the ranging method may include positioning an optical fiber in a target wellbore having a conductive member disposed therein; applying a current flow to the conductive member; and utilizing the optical fiber to measure the current flow on the conductive member. Likewise, a method for performing steam assisted gravity drainage to recover hydrocarbons from a formation has been described. Embodiments of the hydrocarbon recovery method include producing an alternating current flow in a target wellbore; measuring the current in the target wellbore utilizing an optical fiber; measuring from a wellbore being drilled the electromagnetic field emanating from the current flow; injecting steam in one of the wellbores to cause hydrocarbons in the formation to migrate to the other wellbore; and recovering hydrocarbons from the other wellbore. Likewise, a method for measuring current along a conductive body has been described. Embodiments of the current measurement method may include positioning an optical fiber adjacent a conductive member; applying a current flow to the conductive member; and utilizing the optical fiber to measure the current flow on the conductive member. Likewise, a method for utilizing an optical sensor has been described. Embodiments of utilizing an optical sensor may include providing an optical sensor having a core formed of material selected from the group consisting of magnetically responsive material and electrically responsive material; and an optical fiber disposed adjacent said core; and utilizing the core to alter the optical response of the optical fiber. For any of the foregoing embodiments, the method may include any one of the following steps, alone or in combination with each other:

The magnitude of the current flow at at least one location along the conductive member is measured.
The intensity of the current flow along the conductive member is measured.
Positioning a magnetically responsive material adjacent the optical fiber.
Altering an optical response of the optical fiber utilizing the magnetically responsive material.
Altering a property of the magnetically responsive material by positioning the magnetically responsive material in a magnetic field produced by the current flow in the conductive member.
Generating an alternating current and causing the alternating current to flow along the conductive member.
Injecting a current into the formation in which the target wellbore extends from a second wellbore in the formation.
Utilizing an electromagnetic field sensing instrument disposed in a second wellbore to measure a magnetic field emanating from the conductive member; and determining a range of the target wellbore from the second wellbore utilizing the measured magnetic field and measured current flow.
Measuring the magnetic field while conducting drilling operations.
Utilizing the range to guide a drill bit.
The alternating current is a low frequency.
The frequency is between approximately 1 to 30 Hertz.
Initiating drilling of the second well; and, interrupting drilling during the step of taking measurements.
Drilling the wellbore being drilled; suspending drilling and measuring the electromagnetic field; and continuing drilling based on the measured electromagnetic field and current.
Altering an optical response of the optical fiber utilizing the magnetically responsive material.

Altering a property of the magnetically responsive material by positioning the magnetically responsive material in a magnetic field produced by the current flow in the conductive member.

Generating an alternating current and causing the alternating current to flow along the conductive member.

Utilizing the magnetic field to generating a strain on the optical fiber.

Identifying a current magnitude based on the strain on the optical fiber.

Measuring a property based on an altered optical response.

Placing a sensor core in a magnetic field and altering the core utilizing the magnetic field.

Inducing a strain on an optical fiber based on an altered core.

Utilizing a magnetic field to alter the optical response of an optical fiber.

Utilizing the magnetic field to generate a strain on an optical fiber.

Identifying a property magnitude based on the strain on an optical fiber.

A measured property magnitude is electrical current magnitude.

Measuring electrical current based on an altered optical response.

Although various embodiments and methods have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

The invention claimed is:

1. A wellbore ranging system for surveying a target wellbore from a second wellbore, said system comprising:
   an electromagnetic field sensing instrument disposed in the second wellbore;
   an elongated conductive member disposed in the target wellbore, at least a portion of the conductive member oriented along an axis that is substantially parallel with the target wellbore;
   an electric current source exciting current flow in the conductive member of the target wellbore; and
   a fiber optic cable disposed along a length of the conductive member of the target wellbore and configured to measure current flow along the conductive member.

2. The system of claim 1, wherein the fiber optic cable comprises a fiber optic sensor configured to measure the current flow along the conductive member, wherein said fiber optic sensor comprises an optical fiber and a core formed of material selected from the group consisting of magnetically responsive material and electrically responsive material, and wherein the optical fiber is disposed adjacent said core.

3. The system of claim 2, wherein the core is formed of a magnetostrictive material and the optical fiber is bonded to the core.

4. The system of claim 2, wherein the core is formed of a magnetically permeable material and the optical fiber forms at least one loop around the core.

5. The system of claim 2, wherein the core is formed of an electrostrictive material and the optical fiber is bonded to the core.

6. The system of claim 2 wherein said core is comprised of an elongated body disposed along an axis and the sensor is positioned adjacent the conductive member so that an elongated axis of the core is substantially perpendicular to the axis of the conductive member.

7. The system of claim 1, further comprising a fiber optic interrogation system in optical communication with the fiber optic cable.

8. The system of claim 2, further comprising a plurality of fiber optic sensors disposed along at least a portion of the length of the conductive member to form a sensor array.

9. The system of claim 1, wherein the conductive member is casing.

10. The system of claim 1, wherein the conductive member is a tubular positioned within the target wellbore.

11. The system of claim 1, wherein the electric current source is in direct electrical communication with the conductive member.

12. The system of claim 1, further comprising a drill string in the second wellbore, the drill string having multiple drill pipe sections with a drill bit disposed on an end of the drill string, wherein the electromagnetic field sensing instrument is carried by the drill string.

13. A wellbore ranging system for surveying a target wellbore from a second wellbore, said system comprising:
   a bottom hole assembly carried at a distal end of a drill string disposed in the second wellbore, the bottom hole assembly comprising an electromagnetic field sensing instrument and a drill bit;
   an elongated conductive member disposed in the target wellbore, at least a portion of the conductive member oriented along an axis that is substantially parallel with the target wellbore;
   an electric current source exciting current flow in the conductive member of the target wellbore; and
   a fiber optic sensor system, the fiber optic sensor system comprising:
      a fiber optic interrogation system;
      an optical fiber cable extending from the fiber optic interrogation system and disposed along a length of the conductive member; and
      a fiber optic sensor array comprising a plurality of spaced apart fiber optic sensors coupled to the optical fiber cable and disposed along a length of the optical fiber cable, each sensor having a core formed of material selected from the group consisting of magnetically responsive material and electrically responsive material, wherein the fiber optic sensor array is configured to measure current flow along the conductive member.

14. The system of claim 13, wherein the conductive member is an electrically conductive casing disposed within the target wellbore and wherein the electric current source is in direct electrical communication with the conductive member, the bottom hole assembly further comprising a power system disposed to provide power to the electromagnetic field sensing instrument and a directional steering system disposed to steer the drill bit.

15. A method for electromagnetic ranging comprising:
   positioning an optical fiber in a target wellbore along a length of a conductive member disposed therein;
   applying a current flow to the conductive member;
   utilizing the optical fiber to measure the current flow along the conductive member;
   utilizing an electromagnetic field sensing instrument disposed in a second wellbore to measure a magnetic field emanating from the conductive member; and determining a range of the target wellbore from the second wellbore utilizing the measured magnetic field and measured current flow.

16. The method of claim 15, wherein a magnitude of the current flow at at least one location along the conductive member is measured.

17. The method of claim 15, wherein an intensity of the current flow along the conductive member is measured.

18. The method of claim 15, further comprising positioning a magnetically responsive material adjacent the optical fiber.

19. The method of claim 18, further comprising altering an optical response of the optical fiber utilizing the magnetically responsive material.

20. The method of claim 19, further comprising altering a property of the magnetically responsive material by positioning the magnetically responsive material in a magnetic field produced by the current flow in the conductive member.

21. The method of claim 15, further comprising utilizing the range to guide a drill bit.

22. The method of claim 15, further comprising:
drilling the second wellbore;
suspending drilling and measuring the electromagnetic field; and
continuing drilling based on the measured electromagnetic field and current.

23. The method of claim 15, wherein the optical fiber comprises an optical sensor having a sensor core formed of material selected from the group consisting of magnetically responsive material and electrically responsive material, and wherein the method further comprises:
utilizing the core to alter an optical response of the optical fiber.

24. The method of claim 23, further comprising, measuring a property based on the altered optical response.

25. The method of claim 23, further comprising altering the core based on the current flow to induce a strain on the optical fiber.

26. The method of claim 23, further comprising utilizing a magnetic field to alter the optical response of the optical fiber.

27. The method of claim 15, further comprising:
injecting steam in one of the wellbores to cause hydrocarbons in a formation to migrate to the other wellbore; and
recovering hydrocarbons from the other wellbore.

28. The system of claim 9, wherein the fiber optic cable is disposed outside the casing.

* * * * *